(12) United States Patent
Hartel et al.

(10) Patent No.: US 7,637,219 B2
(45) Date of Patent: Dec. 29, 2009

(54) PALLET HAVING STRIP-LIKE SUPPORT ELEMENTS MADE OF PLASTIC WITH EMBEDDED FIBERS

(75) Inventors: Marc Andreas Hartel, Reiskirchen (DE); Thomas Speck, Schallstadt-Mengen (DE); Tina Steinbrecher, Freiburg (DE); Deane Harder, Freiburg (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 11/891,051

(22) Filed: Aug. 8, 2007

(65) Prior Publication Data

US 2008/0087203 A1 Apr. 17, 2008

(30) Foreign Application Priority Data

Aug. 10, 2006 (DE) ........................ 10 2006 037 482

(51) Int. Cl.
*B65D 19/38* (2006.01)

(52) U.S. Cl. ............... 108/57.12; 108/51.11; 108/57.22

(58) Field of Classification Search ............. 108/57.12, 108/57.28, 51.11, 901, 902, 57.25, 51.3, 108/56.3, 57.22; 206/386, 599, 600; 248/346.02, 248/560, 562, 609, 632, 633, 634
See application file for complete search history.

(56) References Cited

U.S. PATENT DOCUMENTS

| | | | | |
|---|---|---|---|---|
| 3,267,882 A | * | 8/1966 | Rapson et al. ............ | 108/57.12 |
| 3,275,131 A | * | 9/1966 | Erickson .................. | 108/57.12 |
| 4,293,605 A | * | 10/1981 | Persson et al. ............ | 108/51.3 |
| 4,303,019 A | * | 12/1981 | Haataja et al. ........... | 108/57.28 |
| 4,687,079 A | * | 8/1987 | Gladish .................. | 248/638 |
| 5,588,371 A | * | 12/1996 | Looker ................... | 108/57.12 |
| 5,765,800 A | * | 6/1998 | Watanabe et al. .......... | 248/638 |
| 5,970,886 A | * | 10/1999 | Knio ..................... | 108/57.12 |
| 6,112,672 A | * | 9/2000 | Heil ..................... | 108/57.12 |
| 6,357,197 B1 | * | 3/2002 | Serino et al. ............ | 52/834 |
| 6,418,862 B1 | * | 7/2002 | Heil ..................... | 108/57.12 |
| 6,541,097 B2 | * | 4/2003 | Lynch et al. ............. | 108/57.28 |
| 6,598,545 B2 | * | 7/2003 | Ryaboy et al. ........... | 108/57.12 |
| 6,609,467 B2 | * | 8/2003 | Monson et al. .......... | 108/57.12 |
| 6,730,249 B2 | * | 5/2004 | Sears et al. ............. | 264/141 |
| 6,938,558 B1 | * | 9/2005 | Peres .................... | 108/56.3 |
| 6,969,781 B2 | * | 11/2005 | Graef et al. ............. | 604/367 |
| 7,074,918 B2 | * | 7/2006 | Medoff et al. ............ | 536/56 |
| 7,470,463 B2 | * | 12/2008 | Medoff et al. ............ | 428/292.4 |
| 2007/0221102 A1 | * | 9/2007 | Reinhall ................. | 108/57.12 |
| 2007/0283858 A1 | * | 12/2007 | Ballard .................. | 108/57.12 |

FOREIGN PATENT DOCUMENTS

| | | |
|---|---|---|
| DE | 36 12 647 A1 | 10/1987 |
| DE | 299 09 001 U1 | 9/1999 |
| JP | 07329969 A | 12/1995 |

OTHER PUBLICATIONS

Co-Pending U.S. Appl. No. 11/891,066, filed Aug. 8, 2007.

* cited by examiner

*Primary Examiner*—José V Chen
(74) *Attorney, Agent, or Firm*—Pauley Petersen & Erickson

(57) ABSTRACT

A pallet for receiving and transporting loads, having an upper platform for receiving the loads and block-like or strip-like support elements which are attached to or can be attached to its underside by connecting sections. At least the support elements are made of plastic with fiber material embedded therein. Advantageous shock absorbing properties, along with an advantageous structure, are achieved because the fiber material consists of natural fibers.

7 Claims, 1 Drawing Sheet

PALLET HAVING STRIP-LIKE SUPPORT ELEMENTS MADE OF PLASTIC WITH EMBEDDED FIBERS

BACKGROUND OF THE INVENTION

1. Field of the Invention

This invention relates to a pallet for receiving and transporting loads, having an upper platform for receiving the loads and with block-like or strip-like support elements which are attached to or can be attached to an underside by connecting sections, wherein at least the support elements are made of plastic with embedded fiber material.

2. Discussion of Related Art

A pallet is taught by German Patent Reference DE 36 12 647 A1. In connection with this known pallet, in which packages to be stored or transported are received on support plates, attached to a supporting substructure, plastic is used, which has a fiber material embedded and which is of stamping waste made of resin-soaked woven fiberglass comminuted into flakes.

In connection with pallets made of plastic as taught by German Patent Reference DE 299 09 001 U1, intermediate blocks, on which a receiving platform is placed, have fiber mats or a bi-axially stretched thermoplastic material, if required with additives, for reinforcement, wherein the fiber mats are fiberglass or coal fiber mats.

In Japanese Patent Reference JP 07329969, plastic material with introduced metallic reinforcement elements is used for the construction of pallets.

In contrast to pallets made of wood, which are put together from relatively many pieces, the pallets made of plastic with embedded fiber material offer advantages in their manufacture and shaping, along with a relatively great stability. However, even with such a design it is not always possible to meet high demands made on damping ability to handle shocks, which can have damaging effects on the contained goods, in particular during transport.

SUMMARY OF THE INVENTION

One object of this invention is to provide a pallet of the type mentioned above but with an ability for recycling, also that meets heavy demands made on the damping of shocks.

This object is attained by a pallet having characteristics taught in this specification and the claims. In this connection, the fiber material can be of natural fibers.

Based on their naturally existing structure, fiber materials made from natural fibers have great stability and damping capability in case of occurring shocks, so that blows to the received goods are particularly effectively damped in connection with such sudden forces, which has been found by testing. Thus, it is possible to better protect sensitive goods against damage due to shocks during transport. Also, the material naturally offers a satisfactory recycling ability.

The structure offers advantageous shock absorption in regard to goods to be used because the material and the structure of at least the support elements with embedded natural fibers have resilient and damping properties which are matched to the weights to be absorbed. For example, it is possible to suitably set as parameters the direction of the fibers, the amount of fibers and/or the type of embedding of the material and/or its shaping.

Furthermore, those measures regarding the manufacture and absorption properties of the pallet are advantageous, wherein at least the support elements have interior hollow spaces. Thus, it is possible by optimizing the weight, along with the required sturdiness and absorption properties, to also advantageously affect the material requirements and handling.

Different embodiments include that the hollow spaces are produced by pores in the plastic material and/or by shaping.

The structure and the support properties, as well as the ability to operate, are favored because the support elements are designed as profiled strips.

In this case, particularly good shock absorption properties and stability result from the plastic material being a polyurethane foam or a thermoplastic material, and the fiber material being of hemp fibers.

Furthermore, the steps contribute to satisfactory shock absorption wherein supporting wall sections between the upper platform and the substructure are inclined in cross section, at least in sections, with respect to a horizontal line, or are curved, by which the support forces and sturdiness can also be suitably affected.

Function, manufacture and ease of handling are also favorably affected because the strip-like support elements are embodied as hollow profiled sections.

Advantageous design possibilities include the supporting wall sections have an X-shaped, S-shaped, round or oval structure.

Stability and functional ability during shock absorption are advantageously affected because the moduli of elasticity of the fiber material and of the plastic material, in which it is embedded, make a gradual transition in order to minimize shear stresses. Thus, a separation of the fibers from the material in which they are embedded is countered.

The use of natural fibers also provides advantages because this is a replenishable raw material, which can be thermally recycled.

BRIEF DESCRIPTION OF THE DRAWINGS

This invention is explained in greater detail in view of exemplary embodiments, making reference to the drawings, wherein.

DETAILED DESCRIPTION OF THE INVENTION

Figure 1:
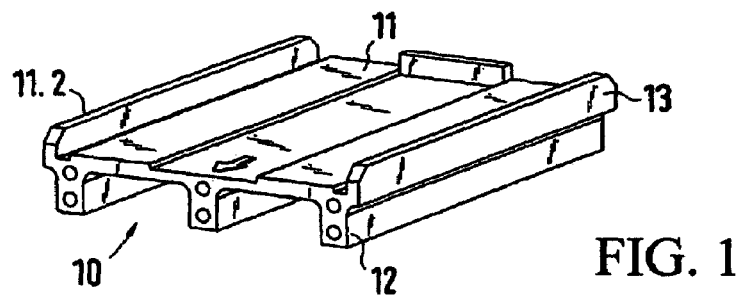
FIG. 1 is a perspective plan view of a shock pallet, in a one-piece embodiment with shock-damping support.

FIG. 1 shows a pallet 10, formed as a single piece and having an upper platform 11 with edges that are delimited by lateral, upwardly projecting rib-like bordering sections 11.2, by a rear bordering section 11.3, which also projects upward and has on the underside longitudinally extending, parallel, strip-like support elements 12, which are formed on it in one piece. Two of the three support elements 12 are arranged in the lateral edge area and one in the center, wherein free spaces for lifting elements of forklifts remain open between the support elements 12. Hollow spaces extending in the longitudinal direction are formed in the support elements 12, which not only result in savings of material, but also in resilience and damping properties, which are advantageous for shock absorption.

The pallet 10, embodied as a shock pallet contains a fiber material of natural fibers embedded into a plastic material as the support, wherein a polyurethane foam with embedded hemp fibers can be advantageous. However, other natural fibers, such as wood, for example, can be employed. This combination of plastic and fiber material, in particular polyurethane foam and hemp fibers, per se results in great stability with advantageous shock absorption properties, in which the natural fiber structure advantageously affects the absorption of shocks, along with great stability. The hemp fibers have a thread-like micro-structure embedded in a woven support, wherein the moduli of elasticity of the polyurethane foam and of the hemp fibers can be matched to each other and the degree of damping can be adjusted by the direction of the fibers. Also, the shock absorption properties can be affected by their amount and by the embedding structure, such as, for example, crinkled or oriented in a preferred direction, and by the length of the fibers, and can be adjusted to the weight of the goods to be received and to their properties.

Figure 2A:
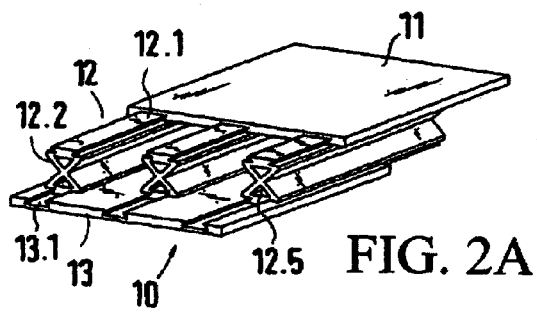
FIGS. 2A and 2B each shows a pallet including an upper platform and a lower platform with interspersed support elements of a first cross-sectional shape in a partially exploded or combined representation.
Figure 2B:
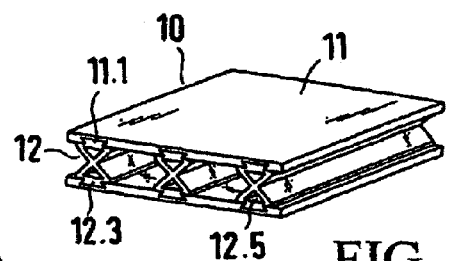

In connection with the embodiment shown in FIGS. 2A and 2B, the support elements 12 are designed separate from the upper platform 11, on which the goods to be stored or to be transported are received, and from a lower platform 13, which is seated on a substructure. The support elements 12, which are designed X-shaped in cross section, form hollow profiled sections with two hollow chambers which are triangular in cross section, wherein the support sections, which extend from the top to the bottom, are oriented obliquely with respect to a horizontal line, and therefore also to a vertical line, and the intersecting legs are closed off at the top and bottom by a respective covering wall. Respective counter-connecting sections 12.1 or 12.3 of a dovetailed cross section are formed on the top of the upper covering wall and the underside of the lower covering wall which, in the assembled state, is pushed, as free of play as possible and with a certain amount of press fit, into complementary groove-shaped connecting sections 11.1 or 13.1 at the underside of the upper and the top of the lower platform. Suitable holding structures can be inserted in one piece into the connecting sections 11.1 or 13.1 and/or the counter-connecting sections 12.1 or 12.3, or additional fastening elements can be used, in order to fix the support elements 12 and the upper platform 11 and the lower platform 13 securely against each other. With these measures it is possible to advantageously make available to the user as packaged units for the respective requirements, pallets which are made of the previously described material including plastic with embedded natural fibers and which are simple to put together.

Figure 3A:
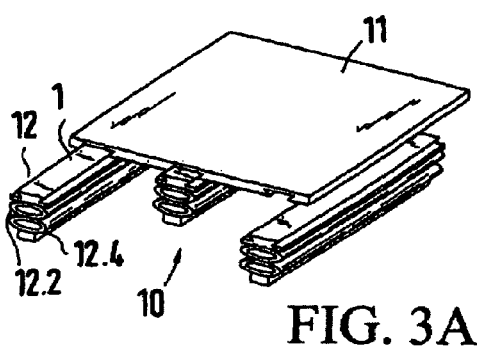
FIGS. 3A and 3B each shows a pallet including an upper platform and support elements, having a different cross section, in a partially exploded or combined representation.
Figure 3B:
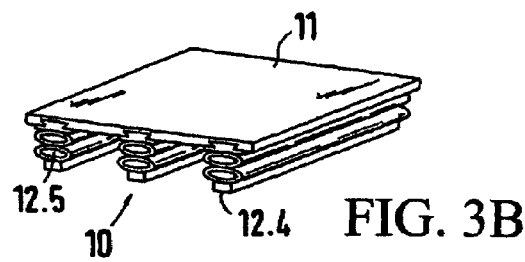

FIGS. 3A and 3B show a different construction of a pallet 10 with an upper platform 11 and support elements 12 attached underneath it, wherein the connection between the upper platform 11 and the support elements 12, corresponding to the previous exemplary embodiment via a connecting section 11.1, is in the shape of a dovetail-shaped groove and a counter-connecting section 12.1 in the form of a protrusion, dovetail-shaped in cross section, in the manner of a tongue-and-groove connection. Underneath the respective counter-connecting section 12.1, the support elements 12 have counter-sections which are formed thereon and have the shape of an ellipse in cross section, wherein the hollow spaces in the shape of an ellipse in cross section extend in the longitudinal direction of the hollow profiled sections thus formed, and the long semi-axes of the ellipses are horizontally arranged, so that a relatively wide support with curved support sections results, by which an advantageous shock absorption can be achieved. For placement on the ground, a runner 12.4 is respectively formed on the underside of the profiled strips, which have two hollow spaces.

Figure 4:
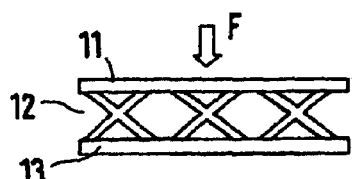
FIGS. 4 and 5 show further embodiments of the pallet in a front view with an upper and a lower platform and with support elements of different cross section arranged between them.

In the embodiment shown in FIG. 4, a support device with support elements 12, which are S-shaped in cross section and respectively form two open hollow spaces, is arranged between the upper platform 11 and the lower platform 13, wherein the support force can be set to be respectively lower than with closed hollow spaces, but on the other hand a limit to the resilient travel is achieved because of the free, longitudinally extending downward or upward directed end edges, so that excessive stretching, which could lead to breaking of the support sections, is prevented. The support elements thus can be formed in one piece on the upper or lower platform 11, 13, or can be fixed in place by a connecting section 11.1 or 13.1 on the one side at the platforms 11, 13, and with counter-connecting sections at the support elements 12 on the other side, as in the previously mentioned embodiments.

Figure 5:
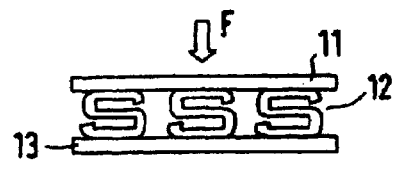

In the embodiment shown in FIG. 5, in which the support elements are designed to be X-shaped, the support elements 12 can also be formed on the upper or lower platform 11, 13 wherein, depending on the support strength, the wall thickness of the legs and/or their inclination and/or their number over the width of the pallet can be selected as a function of the weight to be supported and the shock to be absorbed.

The parameters of the material composition of plastic material and natural fibers on the one hand, and the shaping and dimensions of the support elements 12 on the other, can be suitably matched to each other for achieving maximum shock absorption, wherein the properties of the respective goods to be transported, such as cabinets or housings with inserts, and/or the properties of the transport means, and the shock actions arising along therewith, can be respectively taken into consideration.

Besides advantageous shock absorption properties, the described structure can, as a result of the selected material, also be advantageously thermally recycled and, as a result of the regrowth of the raw material, have an advantageous material basis.

German Patent Reference 10 2006 037 482.7, the priority document corresponding to this invention, and its teachings are incorporated, by reference, into this specification.

What is claimed is:

1. A pallet for receiving and transporting loads, comprising:
   an upper platform for receiving the loads, the upper platform having an underside surface including a first plurality of groove-shaped connecting sections extending in the underside surface from a first side edge of the underside surface to an opposite second side edge of the underside surface;
   a lower platform having a top side surface including a second plurality of groove-shaped connecting sections extending parallel to the first plurality of groove-shaped connecting sections and extending in the top side surface from a first side edge of the top side surface to an opposite second side edge of the top side surface;
   a plurality of longitudinally extending strip-like support elements which are attachable to the underside surface of the upper platform and the top side surface of the lower platform, and each of the support elements extending from the first side edge of each of the upper platform and the lower platform to the opposite second side edge;
   each of the support elements including a first counter-connecting section extending along a top portion and that is inserted into one of the first plurality of groove-shaped connecting sections to dispose the support elements parallel to one another;

each of the support elements including a second counter-connecting section extending along a bottom portion and that is inserted into one of the second plurality of groove-shaped connecting sections;

each of the supports elements having a profile section extending between the first and second counter-connecting sections and that includes one of an X-shaped, an S-shaped, a round or an oval cross-sectional structure, the profile section structure forming two longitudinally-extending hollow spaces, each of the longitudinally-extending hollow spaces extending a length of the support elements and having a length dimension that extends parallel to the upper and lower platforms;

wherein at least the support elements are made of polyurethane foam with hemp fibers embedded therein.

2. The pallet in accordance with claim 1, wherein a material and the structure of at least the support elements with the embedded natural fibers have resilient and damping properties which are matched to weights to be absorbed.

3. The pallet in accordance with claim 2, wherein a moduli of elasticity of the fiber material and of the plastic material in which it is embedded gradually transition in order to minimize shear stresses.

4. The pallet in accordance with claim 1, wherein supporting wall sections between the upper platform (11) and the substructure are, at least in sections, one of inclined in cross section with respect to a horizontal line and curved.

5. The pallet in accordance with claim 4, wherein the strip-like support elements (12) are hollow profiled sections.

6. The pallet in accordance with claim 1, wherein a moduli of elasticity of the fiber material and of the plastic material in which it is embedded gradually transition in order to minimize shear stresses.

7. A pallet for receiving and transporting loads, comprising:

an upper platform for receiving the loads and strip-like support elements which are attached to or can be attached to an underside of the upper platform by connecting sections and which are provided with interior hollow spaces, each of the support elements including a counter-connecting section that is inserted into one of the plurality of groove-shaped connecting sections to dispose the supports elements parallel to one another;

a lower platform having a top side including a second plurality of groove-shaped connecting sections, and each of the support elements including a second counter-connecting section that is inserted into one of the second plurality of groove-shaped connecting sections of the lower platform;

at least the support elements made of a material comprising hemp fibers embedded in a polyurethane foam;

the material and a structure of the at least the support elements with the embedded hemp fibers have resilient and damping properties that are matched to weights to be absorbed, wherein the modules of elasticity of the hemp fibers and of the polyurethane foam are matched to each other in a gradual transition for minimizing shear stresses; and hollow spaces produced by shaping in such a way that the strip-like support elements are designed as hollow profiled strips linearly extending between opposing side edges of the upper and lower platforms and whose supporting wall sections between the upper and lower platforms are, at least in a section, curved or inclined in cross section with respect to a horizontal line that is parallel to the upper and lower platforms, wherein the supporting wall cross sections have one of an X-shaped, an S-shaped, a round, or an oval cross-sectional profile structure.

* * * * *